United States Patent Office 3,672,816
Patented June 27, 1972

3,672,816
PROCESS FOR DYEING SYNTHETIC POLYAMIDE TEXTILES WITH DISAZO DYESTUFFS
Johannes Dehnert, Ludwigshafen, Germany, assignor to Badische Anilin- & Soda-Fabrik Aktiengesellschaft, Ludwigshafen (Rhine), Germany
No Drawing. Filed July 9, 1970, Ser. No. 53,682
Claims priority, application Germany, July 10, 1969, P 19 35 004.0
Int. Cl. D06p 1/02
U.S. Cl. 8—41 B    3 Claims

ABSTRACT OF THE DISCLOSURE

Process for the fast dyeing of synthetic polyamides with disazo dyes derived from 4,4' - diamino-stilbene-2,2'-disulfonic acid as diazo component and a phenol or phenols as coupling component.

This invention relates to a method for the fast dyeing of synthetic polyamides.

I have found that colorations and prints of excellent fastness properties may be obtained on structures of synthetic polyamides by using dyebaths or print pastes which contain, in addition to the usual additives, dyes of the general formula

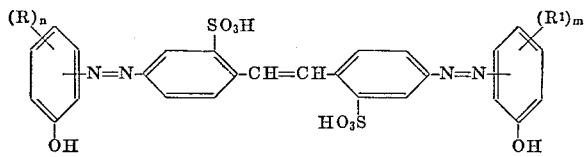

in which R and $R^1$ stand for hydrogen atoms or alkyl groups of from 1 to 4 carbon atoms or cyclohexyl or phenyl radicals and $m$ and $n$ stand for integers from 1 to 4.

Preferably, R and $R^1$ stand for methyl groups and $m$ and $n$ have the value zero or 1.

Where R and/or $R^1$ stands for a phenyl radical, the hydroxybenzenes preferably contain no other substituents apart from said radical.

The dyes used in accordance with the present invention may be obtained by known methods by coupling tetrazotized 4,4' - diaminostilbene-2,2'-disulfonic acid with hydroxybenzenes capable of coupling in ortho or preferably in para position or with a mixture of said hydroxybenzenes.

Examples of coupling components are:

hydroxybenzene,
2-, 3-, or 4-hydroxy-1-methylbenzene,
2-hydroxy-1,4-dimethylbenzene,
4-hydroxy-1,2-dimethyl-benzene,
3-hydroxy-1,2,4-trimethylbenzene,
4-hydroxy-1-t-butylbenzene,
4-hydroxy-1-cyclohexylbenzene,
2- or 4-hydroxy-diphenyl or
3-hydroxy-1-methyl-4-isopropylbenzene.

The dyebaths and print pastes used for dyeing or printing materials such as fibers, flock, filaments, sheeting, woven fabrics or knitted fabrics or synthetic polyamides contain the dyes in the form of their free acids or, more conveniently, in the form of their sodium, potassium or ammonium salts. Dyeing is carried out from a neutral to acid bath, preferably at temperatures ranging from 90° to 100° C., the dyebaths containing the usual auxiliaries.

Synthetic polyamides are, for example, polycaprolactam or poly(hexamethylene diamine adipate) or compounds of a chemically analogous structure.

The dyebaths and print pastes may contain mixtures of the dyes to be used in the process of the invention with each other or with other dyes. Mixtures of the said dyes with each other, as may be obtained, for example, by using more than one coupling component, show an equal degree of fastness but increased water solubility compared with dyes made using only one coupling component. For example, by using two coupling components a mixture of three different dyes is obtained which shows very good solubility and good leveling power.

The dyes used in the process of the invention generally show very good affinity for the synthetic polyamides and excellent leveling power. Colorations and prints are obtained showing excellent allround fastness properties, in particular fastness to light and wet treatments.

In the following examples, the parts and percentages are by weight unless otherwise stated.

EXAMPLE 1

10 parts of a woven fabric of poly(hexamethylene diamine adipate) fibers are placed in 400 parts by volume of a dyebath containing 0.2 part of the dye of the formula:

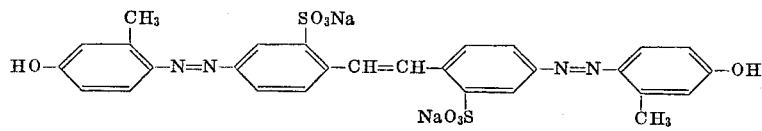

0.3 part of 30% acetic acid and 0.2 part of a commercial leveling agent. Dyeing is commenced at 40° C., and the dyebath is then heated to the boil during 30 minutes and boiled for from 60 to 90 minutes. The dyed material is rinsed and dried. There is thus obtained an orange coloration of very good fastness to light and excellent fastness to wet treatments.

EXAMPLE 2

10 parts of polycaprolactam flock are dyed for 1 hour at the boil in a bath containing 0.2 part of the dye of the formula:

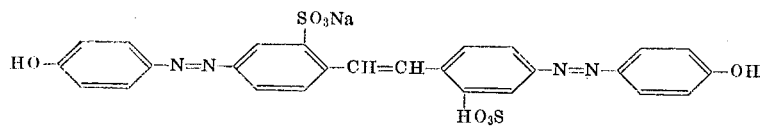

0.2 part of a commercial leveling agent and 2% of 85% formic acid (based on the weight of the material being dyed), the liquor ratio being 40:1. After rinsing and drying there is obtained a reddish yellow coloration showing excellent fastness properties.

EXAMPLE 3

Woven fabric of nylon 6 or nylon 6.6 is printed by one of the conventional methods with a printing ink containing 30 parts of the dye of the formula:

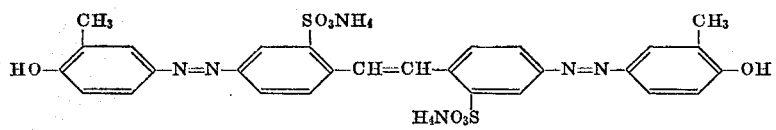

50 parts of di(2-hydroxyethyl)sulfide,
240 parts of hot water,
500 parts of alginate thickening,
50 parts of thiourea, and
20 parts of ammonium sulfate, made up to 1,000 parts with water or further thickener. The printed textile material is dried and then steamed for 2 to 3 minutes at 102° C. The thus treated material is rinsed and dried. There are thus obtained strong orange prints of excellent fastness to light and wet treatments.

If the dyes used in Examples 1, 2 or 3 are replaced by the products of coupling tetrazotized 4,4'-diaminostilbene-2,2'-disulfonic acid with the following compounds, there are produced colorations or prints showing similar properties:

4-hydroxy-1-methylbenzene
2-hydroxy-1,4-dimethylbenzene
4-hydroxy-1,2-dimethylbenzene
4-hydroxy-1-t-butylbenzene
4-hydroxy-1-cyclohexylbenzene
2-hydroxy-diphenyl
3-hydroxy-1-methyl-4-isopropylbenzene
3-hydroxy-1,2,4-trimethylbenzene.

In place of the compounds stated there may be used mixtures of hydroxybenzenes during the manufacture of the dyes, in which case their are obtained dyes having similar shades and tinctorial properties but even better water solubility.

I claim:
1. A process for dyeing or printing a synthetic polyamide textile material which comprises applying to said polyamide textile material from an aqueous neutral to acid bath the dye of the formula

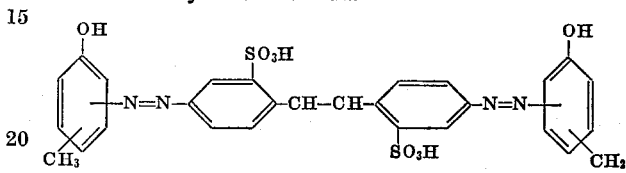

2. A process as claimed in claim 1 wherein said dye has the formula

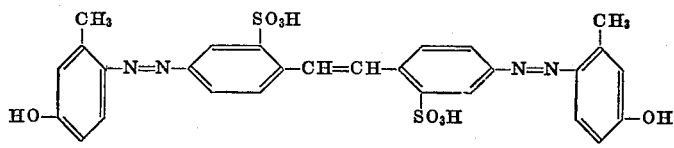

3. A process as claimed in claim 1 wherein said dye has the formula

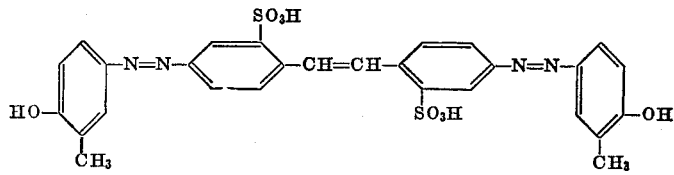

References Cited

UNITED STATES PATENTS

| | | | |
|---|---|---|---|
| 2,286,838 | 6/1942 | Seymour et al. | 260—178 |
| 2,787,614 | 4/1957 | Huber et al. | 260—178 |

OTHER REFERENCES

Colour Index, vol. 2, 2nd ed. 1956, pp. 2004–2009, Publ. AATCC, Lowell, Mass.

Colour Index, vol. 3, 2nd ed. 1956, p. 3194, Publ. AATCC, Lowell Mass.

GEORGE F. LESMES, Primary Examiner
T. J. HERBERT, JR., Assistant Examiner

U.S. Cl. X.R.
260—178